(12) United States Patent
Chang

(10) Patent No.: US 7,007,881 B2
(45) Date of Patent: Mar. 7, 2006

(54) FISHING REEL

(76) Inventor: Liang-Jen Chang, 132, Fu-I Road, Taiping (TW)

( * ) Notice: Subject to any disclaimer, the term of this patent is extended or adjusted under 35 U.S.C. 154(b) by 0 days.

(21) Appl. No.: 10/844,335

(22) Filed: May 13, 2004

(65) Prior Publication Data

US 2005/0253008 A1 Nov. 17, 2005

(51) Int. Cl.
*A01K 89/015* (2006.01)
(52) U.S. Cl. .................. 242/257; 192/52.2; 192/70.15; 192/107 R
(58) Field of Classification Search ................ 242/257, 242/259–262; 192/52.2, 70.15, 107 R, 48.92
See application file for complete search history.

(56) References Cited

U.S. PATENT DOCUMENTS 2,492,819 A 12/1949 Schulz
3,000,477 A 9/1961 Dunn
4,109,882 A 8/1978 Kawakami
5,362,010 A * 11/1994 Takamatsu ................. 242/261
5,791,576 A * 8/1998 Miyazaki .................... 242/261
5,855,330 A * 1/1999 Kobayashi .................. 242/261
5,904,310 A * 5/1999 Miyazaki .................... 242/260
6,412,719 B1 * 7/2002 Hyon .......................... 242/260

* cited by examiner

*Primary Examiner*—Emmanuel Marcelo
(74) *Attorney, Agent, or Firm*—Browdy and Neimark, PLLC

(57) ABSTRACT

A fishing reel has a spool with a spindle and the spindle has a retaining portion to be engaged and disengaged with a slot of a gear rod. The gear rod is provided with two cut faces. While the spool is rotating in high speed, the retaining portion is attached on the cut faces first, and then the retaining portion is totally engaged with the slot after the spool rotates continuously to a predetermined angle. As a result, the spool can be stopped successfully while the spool is rotating in high speed and no damage is occurred between the spindle and the gear rod.

2 Claims, 7 Drawing Sheets

FISHING REEL

BACKGROUND OF THE INVENTION

1. Field of the Invention

The present invention relates generally to a fishing tool, and more particularly to a fishing reel, which can stop the spool while the fishing line is released in high speed.

2. Description of the Related Art

FIG. 14 shows a conventional fishing reel 1, which has a spool 2, a spindle 3 provided to the spool 2 and a gear rod 4. The spindle 3 has a retaining portion 5. The gear rod 4 has a hole 6 through which the spindle 3 extends and a slot 7 to be engaged with the retaining portion 5. The gear rod 4 is moved by a clutch device (not shown) to be engaged and disengaged with the retaining portion 5. The spool 2 rotates independently while the slot 7 of gear rod 4 is disengaged with the retaining portion 5, the spool 2 rotates along with gear rod 4 while the slot 7 of gear rod 4 is engaged with the retaining portion 5.

A new way of fishing is that use alive fishes to be the baits. While the bait fish swims, the line is pulled out very fast from the spool 2 that make the spool 2 rotating in high speed. While the line is pull out for a desirable length, the clutch device moves the slot 7 of gear rod 4 engaged with the retaining portion 5 of the spindle 3 to stop the spool 2 that makes the line can not be pulled anymore. The retaining portion 5 of the spindle 3 has a shape meeting the slot 7 of gear rod 4, so that only the longitudinal axes of the retaining portion 5 and the slot 7 are oriented at exactly the same direction, the retaining portion 5 might be engaged with the slot 7. While the spool 2 is rotating in high speed, the retaining portion 5 is very hard to be engaged with the slot 7. The retaining portion 5 might only be smoothly engaged with the slot 7 while the bait fish swims slow. That is very inconvenient to the fishers. In addition, the retaining portion 5 might only have a little section engaged with the slot 7 while the spindle 3 rotates fast. That would make damage of the retaining portion 5 and the slot 7.

SUMMARY OF THE INVENTION

The primary objective of the present invention is to provide a fishing reel capable of stopping the spool while the line is released in high speed.

The primary objective of the present invention is to provide a fishing reel capable of preventing the spindle and the gear rod from damage.

According to the objectives of the present invention, a fishing reel comprises a reel body, a spool, a handle, a transmission device and a clutch device. The spool is pivoted on the reel body through a spindle. The spindle has a retaining portion. The transmission device has a first end to be coupled with the handle and a second end to be coupled with the spindle for transferring power imported by a user from the handle to the spool. The transmission device has a gear rod at the second end thereof. The gear rod has a hole through which the spindle extends, an original face disposed at an end of the gear rod, and a slot to be engaged and disengaged with the retaining portion of the spindle. The clutch device moves the gear rod between a first position where the slot of the gear rod is disengaged with the retaining portion of the spindle, and a second position where the slot of the gear rod is engaged with the retaining portion of the spindle. The gear rod has two cut faces having opposite ends adjacent to the original face and the slot respectively.

DETAILED DESCRIPTION OF THE INVENTION

Figure 1:
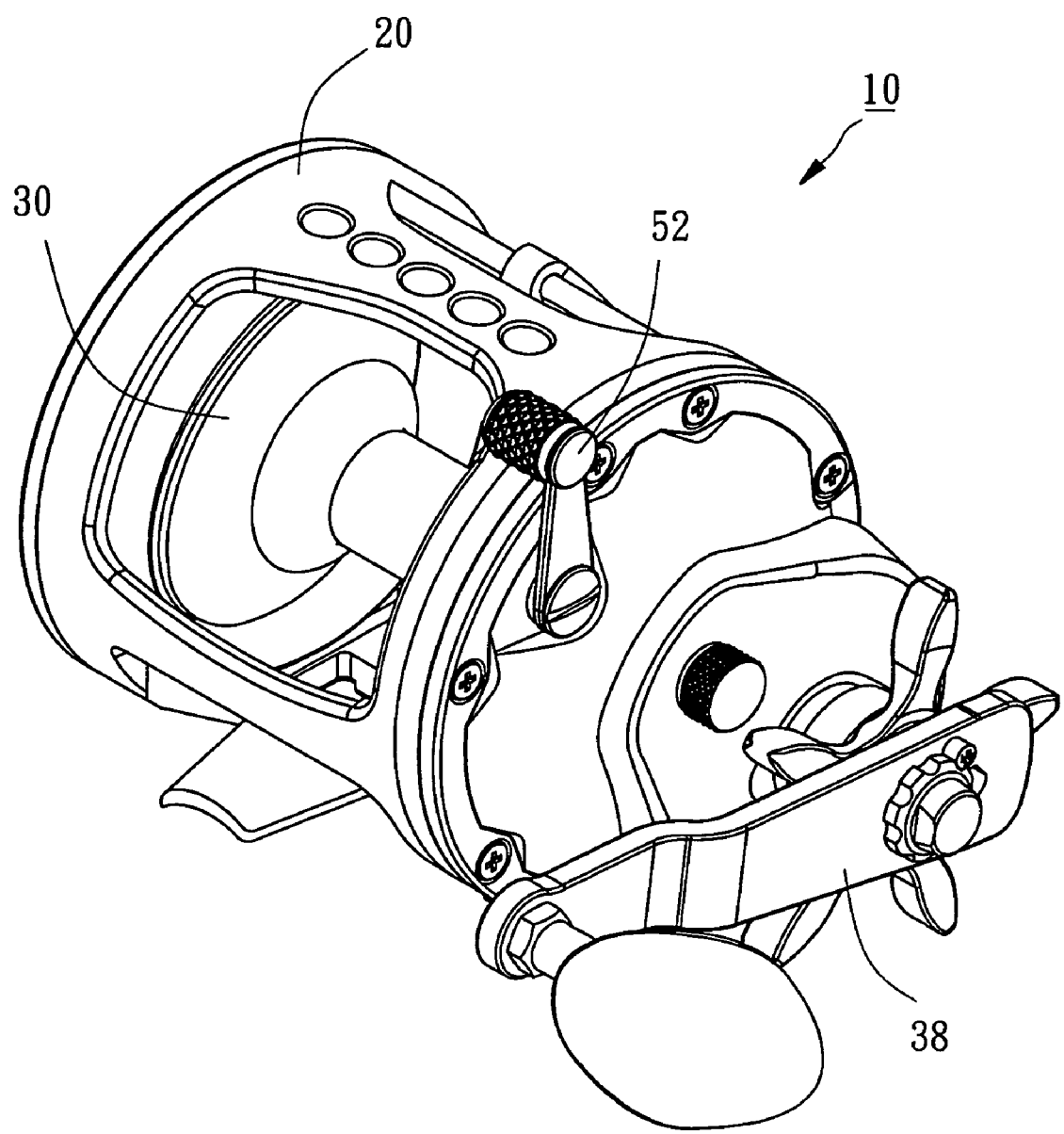
FIG. 1 is a perspective view of a first preferred embodiment of the present invention.
Figure 2:
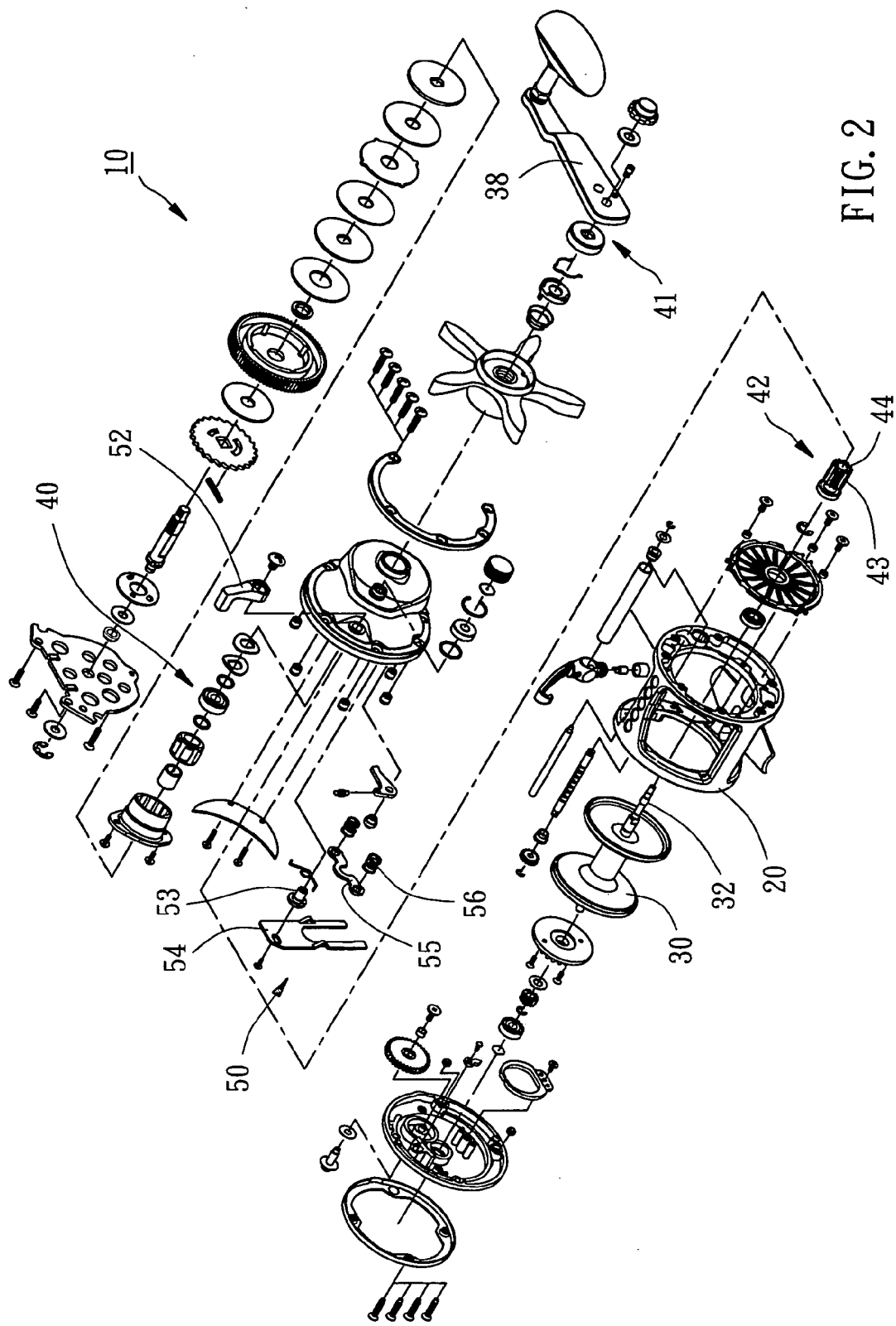
FIG. 2 is an exploded view of the first preferred embodiment of the present invention.
Figure 3:
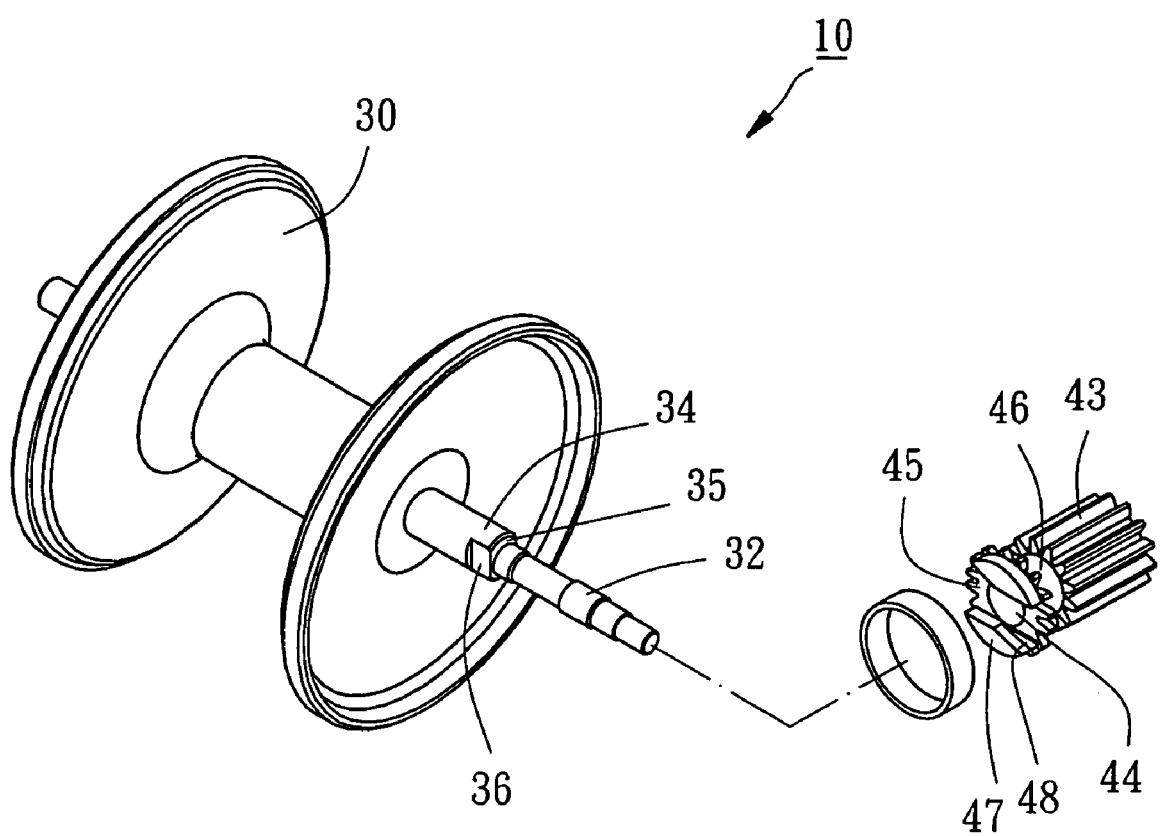
FIG. 3 is an exploded view in parts of the first preferred embodiment of the present invention.

As shown in FIGS. from FIG. 1 to FIG. 3, a fishing reel 10 of the preferred embodiment of the present invention comprises a reel body 20, a spool 30, a handle 38, a transmission device 40 and a clutch device 50.

The spool 30 has a spindle 32 running therethrough and the spindle 32 is coupled with the reel body 20 to pivot the spool 30 on the reel body 20. The spool 30, therefore, rotates freely relative to the reel body 20. A fishing line (not shown) is wound on the spool 30. The spindle 32 is provided with an elongated retaining portion 34 on which has an edge face 35, two contact faces 36 at opposite sides thereof.

Figure 6:
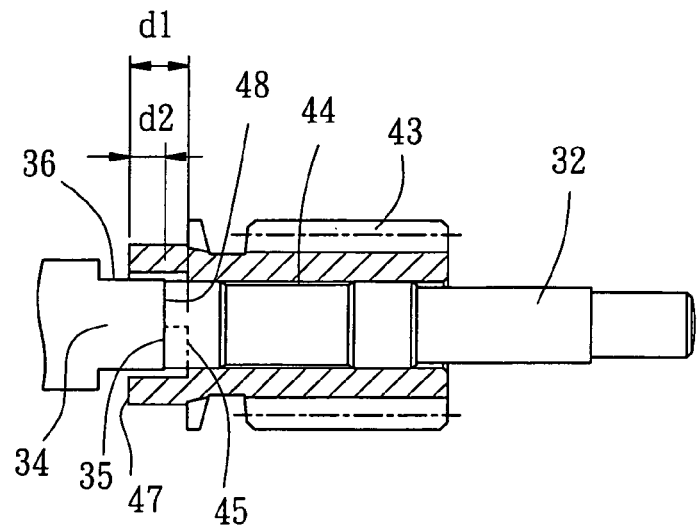
FIG. 6 is a sectional view in parts of the first preferred embodiment of the present invention, showing the second action thereof.

The transmission device 40 is provided in the reel body 20, which has a first end 41 coupled with the handle 38 and a second end 42 coupled with the spindle 32. The handle 38 drives the spool 30 for rotation via the transmission device 40. The transmission device 40 is a conventional device, so I'll not describe the detail. The character of the present invention is that the transmission device 40 is provided with a gear rod 43 at the second end 42 thereof. The gear rod 43 has a hole 44 through which the spindle 32 extends, a slot 45 to be engaged with the retaining portion 34 of the spindle 32 and an annular recess 46 to engaged with the clutch device 50. The gear rod 43 has an original face 47 at an end thereof and the slot 45 is recessed from the original face 47 a first depth d1 as shown in FIG. 6. In addition, the gear rod 43 has two cut faces 48 that are recessed from the original face 47 a second depth d2. It is noted that the first depth d1 is greater than the second depth d2. The cut faces 48 have opposite ends adjacent to the original face 47 and the slot 45 respectively.

The clutch device 50 has a shaft 52 provided on the reel body 20, a cam 53 connected to the shaft 52, a gate plate 54 to be driven by the cam 53 for movement up and down, a movable plate 55 to be engaged with the annular recess 46 of the gear rod 43 and to be attached on the gate plate 54 and two springs 56 mounted at between the reel body 20 and the movable plate 55. While user moves the shaft 52, the movable plate 55 is pushed by the gate plate 54 or the spring 56 to reciprocate along the spindle 32. The clutch device 50 is a conventional device that I'll not describe the detail. The reciprocation of the movable plate 55 drives the gear rod 43 to move between a first position and a second position. While the gear rod 43 is moved to the first position, the gear rod 43 is disengaged with the retaining portion 34 of the spindle 34 to let the spool 30 rotates independently. While the gear rod 43 is moved to the second position, the slot 45 of the gear rod 43 is engaged with the retaining portion 34 of the spindle 34 and the spool 30 is driven to rotation by the transmission device 40.

While user wants to release the line, he/she just moves the shaft 52 to disengage the gear rod 43 with the retaining portion 34 of the spindle 32 via the movable plate 55 that makes the spool 30 rotates freely to let the line being drawn out continuously. In this condition, the gear rod 43 is positioned at the first position.

Figure 5:
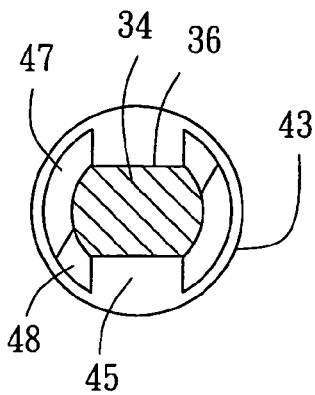
FIG. 5 is a left view of FIG. 4.
Figure 4:
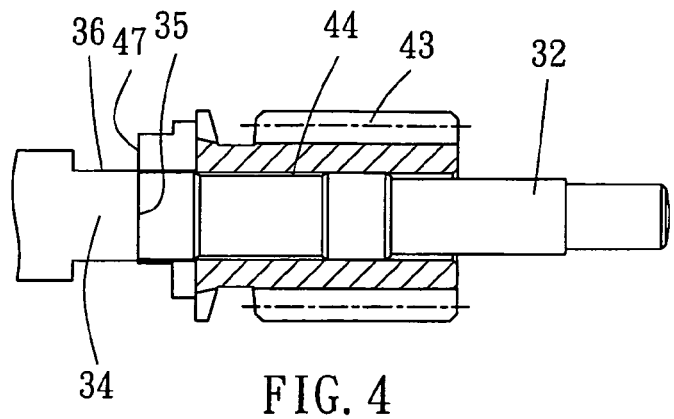
FIG. 4 is a sectional view in parts of the first preferred embodiment of the present invention, showing the first action thereof.
Figure 7:
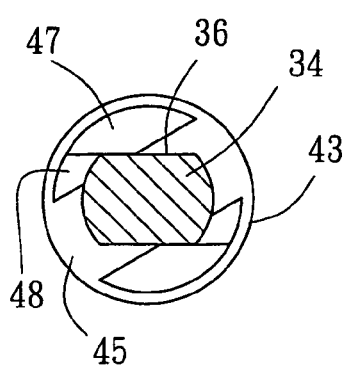
FIG. 7 is a left view of FIG. 6.
Figure 9:
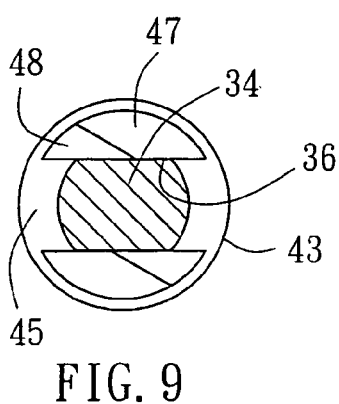
FIG. 9 is a left view of FIG. 8.
Figure 8:
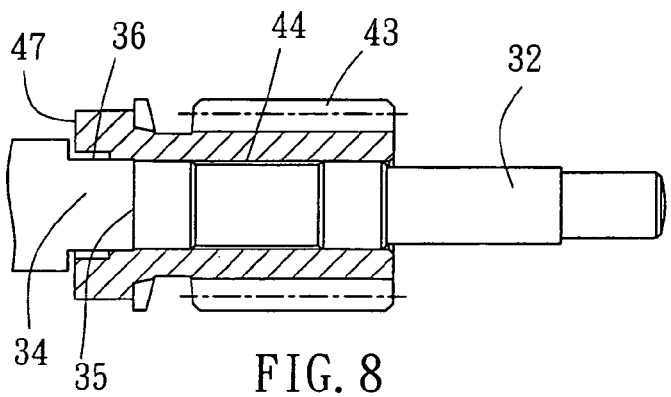
FIG. 8 is a sectional view in parts of the first preferred embodiment of the present invention, showing the first action thereof.

While user wants to stop releasing or drawing the line, he/she moves the shaft 52 back. In such condition, the springs 56 exerts the movable plate 55 to make it moving the gear rod 43 toward the retaining portion 34 of the spindle 32 as shown in FIG. 4 and FIG. 5. In the meantime, the original face 47 of the gear rod 43 is attached on the edge face 35 of the retaining portion 34. While the spindle 32 rotates along with the spool 30 to a predetermined angle, as shown in FIG. 6 and FIG. 7, the gear rod 43 moves toward the retaining portion 34 further for a predetermined distance, it is d2, and the cut faces 48 are attached on the edge face 35 of the retaining portion 34. While the spindle 32 further rotates another predetermined angle, as shown in FIG. 8 and FIG. 9, the gear rod 43 moves toward the retaining portion 34 again for another predetermined distance, it is d1–d2, and the retaining portion 34 is received in the slot 45. In this condition, the gear rod 43 is positioned at the second position. The contact faces 36 of the retaining portion 34 are attached on a sidewall of the slot 45 and the spindle 32 is engaged with the gear rod 43 for stop or rotation.

In other words, the present invention provides the gear rod 43 with the cut faces 48, so that while the spool 30 and the spindle 32 are rotating in high speed, the edge face 35 of the retaining portion 34 is disengaged with the original face 47 of the gear rod 43. The gear rod 43 is moved forward by the springs 56 to force a distal section of the retaining portion 34 moving into the slot 45. After the spindle 32 has rotated to the position shown in FIG. 8, the contact faces 36 of the retaining portion 34 impact the sidewall of the slot 45 and the springs 56 moves the gear rod 43 further via the movable plate 55 that makes the retaining portion 34 totally engaged with the slot 45 to couple the gear rod 43 with the spindle 32.

As a result, there is more time and space for engaging the retaining portion 34 of the spindle 32 with the slot 45 of the gear rod 43, so that the gear rod 43 can be coupled with the spindle 32 easily even when the spool 32 is rotating in high speed. It has sufficient time for the retaining portion 34 to be engaged with the slot 45, i.e. there is a sufficient path for the retaining portion 34 to move into the slot 45 before the contact faces 36 of the retaining portion 34 of the spindle 32 contact the sidewalls of the slot 45 of the gear rod 43, so that the gear rod 43 and the spindle 32 are not easy to be damaged while in engagement and disengagement.

It is noted that the second depth d2 of the cut face 48 can be smaller than, equal to or greater than the first depth d1. The size and the slope of the cut faces are the choice of the manufacturers.

Figure 10:
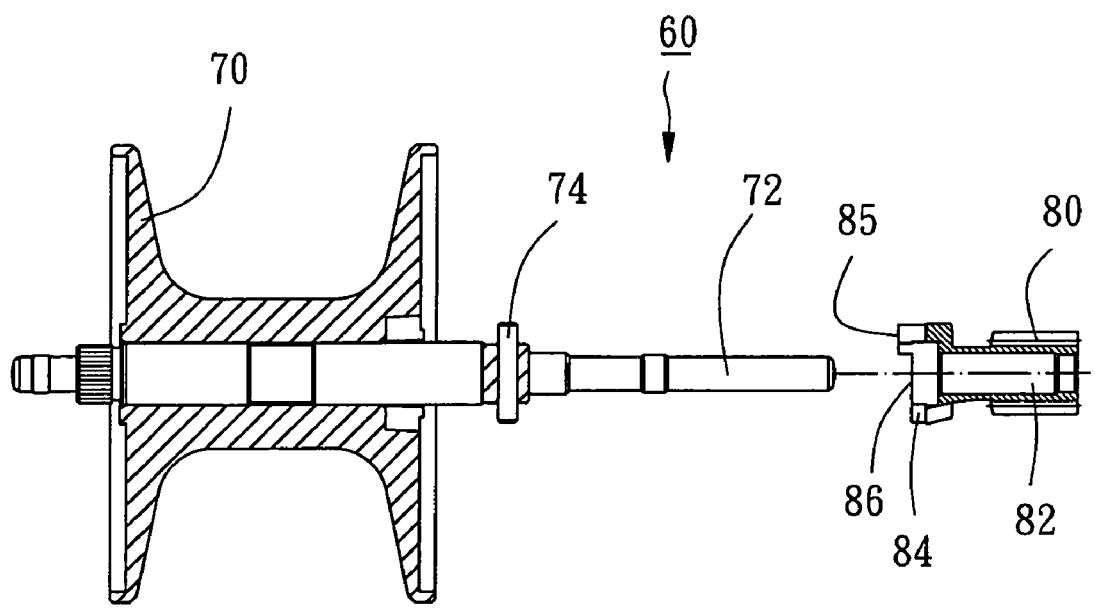
FIG. 10 is an exploded view in parts of a second preferred embodiment of the present invention.
Figure 11:
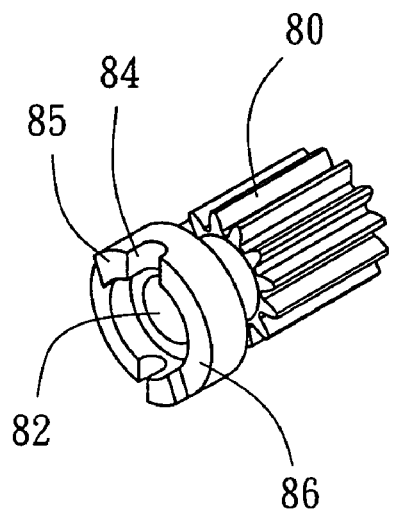
FIG. 11 is a perspective view of the gear rod of the second preferred embodiment of the present invention.
Figure 12:
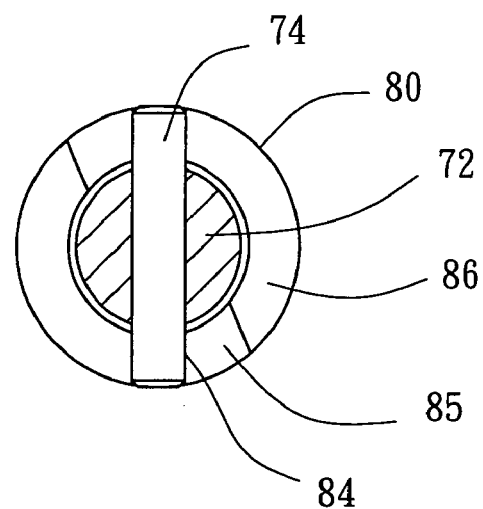
FIG. 12 is a lateral view of the spindle and the gear rod of the second preferred embodiment of the present invention.
Figure 13:
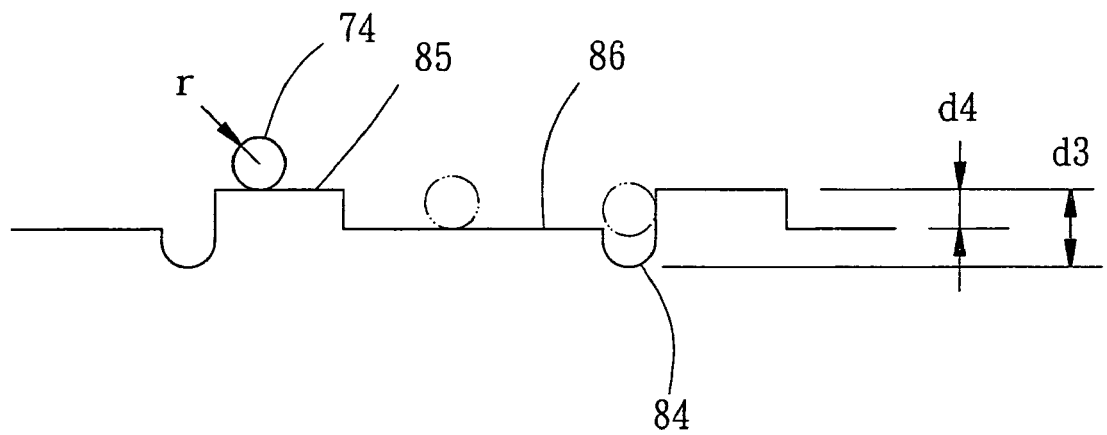
FIG. 13 is an extended view of FIG. 12, showing the path of the retaining portion of the spindle.
Figure 14:
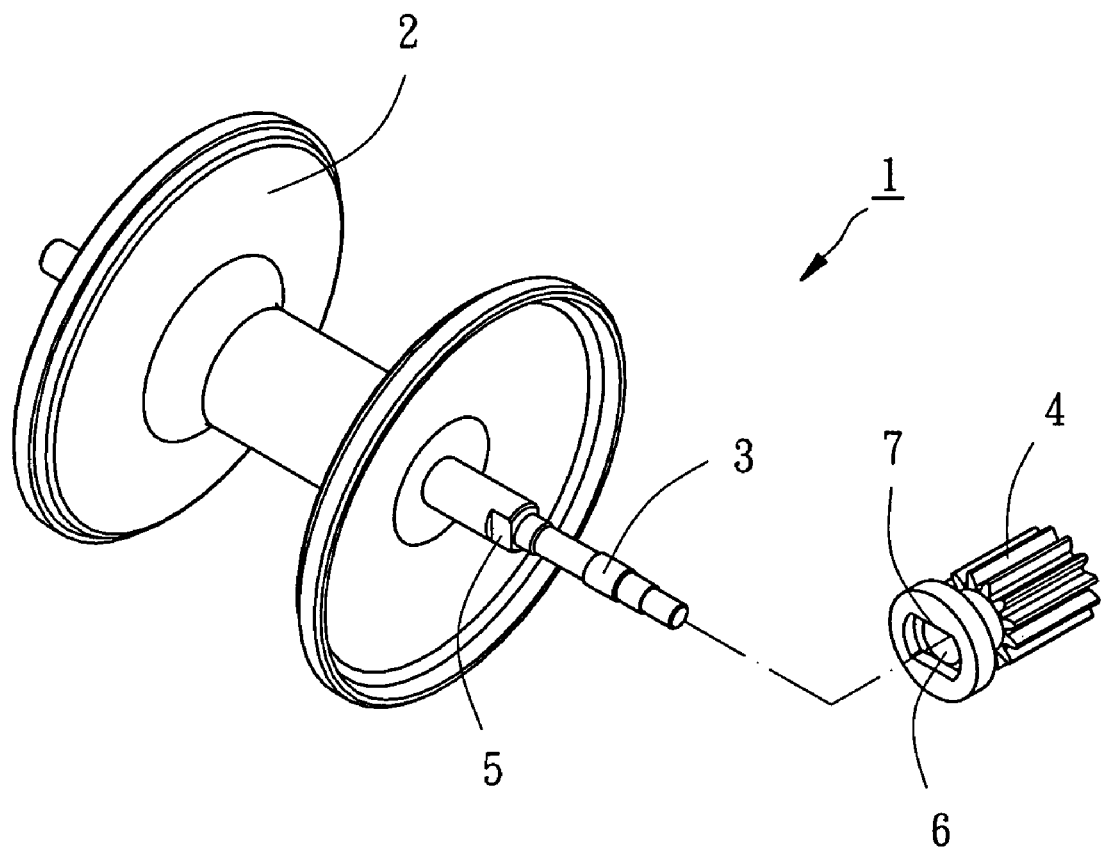
FIG. 14 is an exploded view in parts of the conventional fishing reel.

As shown in FIG. 10, FIG. 11 and FIG. 12, the second preferred embodiment of the present invention provides a fishing reel 60, which comprises a spool 70 and a gear rod 80. The spool 70 has a spindle 72 with a retaining portion 74 and the retaining portion 74 is a round pillar in this preferred embodiment. The gear rod 80 has a hole 82 through which the spindle 72 extends, an original face 85, a slot 84 with a first depth d3 under the original face 85 and two cut faces 86 with a second depth d4 under the original face 85 as shown in FIG. 13.

While the gear rod 80 is disengaged with the retaining portion 74, the spool 70 can rotate freely. While the gear rod 80 is moved by a clutch device (not shown) toward the retaining portion 74, the retaining portion 74 is attached on the original face 85 of the gear rod 80 first as shown in FIG. 13. While the spindle further rotates a predetermined angle, the gear rod 80 moves forward for a predetermined distance, it is d4, to attach the cut faces 86 on the retaining portion 74. After the retaining portion 74 impacts a sidewall of the slot 84, the retaining portion 74 is engaged with the slot 84 securely and without damage because that the second depth d4 is greater than a radius r of the retaining portion 74.

In practice, the second depth d4 can be equal to the radius r of the retaining portion 74.

What is claimed is:

1. A fishing reel, comprising:

a reel body;

a spool pivoted on the reel body through a spindle, the spindle having a retaining portion;

a handle;

a transmission device having a first end to be coupled with the handle and a second end to be coupled with the spindle for transferring power imported by a user from the handle to the spool, wherein the transmission device has a gear rod at the second end thereof, the gear rod having a hole through which the spindle extends, an original face disposed at an end of the gear rod, and a slot to be engaged and disengaged with the retaining portion of the spindle, and a clutch device for moving the gear rod between a first position where the slot of the gear rod is disengaged with the retaining portion of the spindle, and a second position where the slot of the gear rod is engaged with the retaining portion of the spindle;

wherein the gear rod has two cut faces having a planar face perpendicular to the longitudinal axis of the gear rod; and wherein the slot is recessed from the original face a first uniform depth and the planar face of each of the cut faces are recessed from the original face a second uniform depth, wherein the first uniform depth is greater than or equal to the second uniform depth.

2. The fishing reel as defined in claim 1, wherein the retaining portion of the spindle is a round pillar having a length smaller than or equal to that of the second uniform depth.

* * * * *